US008811327B2

(12) United States Patent
Cheng et al.

(10) Patent No.: US 8,811,327 B2
(45) Date of Patent: Aug. 19, 2014

(54) METHOD, SYSTEM AND C-RNC FOR DETERMINING SUPPORT CAPABILITY OF A LOCAL CELL

(75) Inventors: Xiang Cheng, Shenzhen (CN); Lin Liu, Shenzhen (CN); Yazhu Ke, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 94 days.

(21) Appl. No.: 13/591,437

(22) Filed: Aug. 22, 2012

(65) Prior Publication Data
US 2012/0314684 A1 Dec. 13, 2012

Related U.S. Application Data

(63) Continuation of application No. PCT/CN2010/075396, filed on Jul. 22, 2010.

(30) Foreign Application Priority Data

Mar. 2, 2010 (CN) .......................... 2010 1 0117146

(51) Int. Cl.
*H04W 4/00* (2009.01)
*H04W 48/16* (2009.01)
*H04L 27/00* (2006.01)
*H04W 92/12* (2009.01)
*H04L 5/00* (2006.01)
*H04W 88/12* (2009.01)

(52) U.S. Cl.
CPC .............. *H04W 48/16* (2013.01); *H04W 92/12* (2013.01); *H04L 27/0008* (2013.01); *H04L 5/0007* (2013.01); *H04W 88/12* (2013.01)
USPC ...................................................... 370/329

(58) Field of Classification Search
CPC ..... H04L 47/24; H04L 47/70; H04L 43/0852; H04L 2012/5631; H04L 47/10; H04L 47/30; H04L 47/11; H04L 47/15; H04L 47/35; H04L 43/50; H04W 84/18; H04W 84/12; H04W 84/08; H04W 84/06; H04W 72/04; H04W 76/00; H04W 76/02; H04W 4/10
USPC ......... 370/229, 230, 235, 328, 329, 342, 341, 370/252, 395.21; 455/450, 423, 522
See application file for complete search history.

(56) References Cited

U.S. PATENT DOCUMENTS 8,280,424 B2 * 10/2012 Sarkkinen et al. ............ 455/522
2004/0252699 A1 * 12/2004 Drevon et al. ........... 370/395.21
(Continued)

FOREIGN PATENT DOCUMENTS

| CN | 101273659 A | 9/2008 | ................ H04Q 7/38 |
| CN | 101527933 A | 9/2009 | ............ H04W 28/16 |
| EP | 2075963 A1 | 7/2009 | .............. H04L 12/56 |

OTHER PUBLICATIONS

"3rd Generation Partnership Project; Technical Specification Group Radio Access Network; UTRAN Iub interface Node B Application Part (NBAP) signalling (Release 9)," 3GPP TS 25.433, V9.1.1 (Dec. 2009), 1218 pages.

*Primary Examiner* — Abdullah Riyami

(57) ABSTRACT

The present invention discloses a method, a system and a C-RNC for determining the support capability of a local cell, the method comprising the following steps of: a controlling radio network controller (C-RNC) receiving from a node B capability support information about the local cell of the node B, wherein the capability support information comprises uplink multi-carrier capability support information and shared interconnection of type B (IUB) transport bearer capability support information; and the C-RNC determining by default that the local cell supports a separate IUB transport bearer, and determining an uplink multi-carrier support capability and a shared IUB transport bearer support capability of the local cell according to the capability support information. The present invention accelerates the processing of the C-RNC, thereby improving the system performance.

8 Claims, 3 Drawing Sheets

(56) References Cited

U.S. PATENT DOCUMENTS

| | | | |
|---|---|---|---|
| 2006/0056373 A1* | 3/2006 | Legg | 370/341 |
| 2007/0066298 A1* | 3/2007 | Hurst | 455/423 |
| 2008/0049683 A1* | 2/2008 | Nakamata et al. | 370/335 |
| 2008/0102811 A1* | 5/2008 | Amirjoo et al. | 455/424 |
| 2009/0005053 A1* | 1/2009 | Agin et al. | 455/450 |
| 2009/0116468 A1* | 5/2009 | Zhang et al. | 370/342 |
| 2009/0168728 A1* | 7/2009 | Pani et al. | 370/332 |
| 2010/0111023 A1* | 5/2010 | Pelletier et al. | 370/329 |
| 2010/0118723 A1* | 5/2010 | Pani et al. | 370/252 |
| 2010/0130219 A1* | 5/2010 | Cave et al. | 455/450 |
| 2010/0238825 A1* | 9/2010 | Zhang et al. | 370/252 |

\* cited by examiner

METHOD, SYSTEM AND C-RNC FOR DETERMINING SUPPORT CAPABILITY OF A LOCAL CELL This is a continuation of International Application PCT/CN2010/075396, with an International Filing Date of Jul. 22, 2010, which claims priority to Chinese Application No. 201010117146.6, filed Mar. 2, 2010, each of which is incorporated by reference.

TECHNICAL FIELD

The present invention relates to the communication field, and in particular to a method, a system and a controlling radio network controller (abbreviated as C-RNC) for determining the support capability of a local cell.

BACKGROUND ART

The high speed uplink packet access (abbreviated as HSUPA) is a technology which improves the uplink packet data performance by the scheduling of a node B and means of the physical layer fast retransmission and merging and so on, and it adopts an enhance dedicated channel (abbreviated as E-DCH) to bear the user data. A data stream which is mapped to the E-DCH by a protocol data unit (abbreviated as PDU) of the media access control-dedicated (abbreviated as MAC-d) is referred to as a media access control-dedicated flow (MAC-d flow). One terminal has one or more media access control-dedicated flow(s) (MAC-d flow(s)).

In a wireless communications system, an interconnection of type B (abbreviated as IUB) interface is a logic interface between a radio network controller (abbreviated as RNC) and the node B. The IUB interface provides a transmission mode of the uplink E-DCH between the node B and the RNC, and one IUB interface framing protocol layer data stream corresponds to data born by one media access control-dedicated flow (MAC-d flow) of one terminal. Therefore, one terminal corresponds to one or more IUB interface framing protocol layer data stream(s).

In terms of a specific node B set, the role of the RNC is a controlling radio network controller. For any one node B, it has and only has one C-RNC, and this C-RNC owns all right of control for logic resources of this node B. The logic resources of the node B mainly comprises a local cell, and the node B reports configurable resources of the local cell, i.e. the node B's cells capable of being established, by the IUB interface, and subsequently the establishment of the cells is controlled by the C-RNC.

In the single-carrier HSUPA technology, one IUB interface framing protocol layer data stream is born by one IUB interface transport bearer, wherein the IUB interface framing protocol layer data stream does not need to carry a carrier identification.

In the multi-carrier HSUPA technology, one IUB interface framing protocol layer data stream can be born by one IUB interface transport bearer, and can also be born by a plurality of (the number thereof is identical with the number of the carriers in the multi-carrier) IUB interface transport bearers. When one IUB interface framing protocol layer data stream is born by one IUB interface transport bearer, this IUB interface framing protocol layer data stream must carry the carrier identification to distinguish the carrier sources of the born data thereby in an air interface, and this processing mode is referred to as a shared IUB transport bearer mode or an E-DCH UL flow multiplexing mode. When one IUB interface framing protocol layer data stream is born by a plurality of IUB interface transport bearers, according to the carrier sources of the data born by the one IUB interface framing protocol layer data stream in the air interface, the date of one carrier source is born on one IUB interface transport bearer, and the data of a plurality of carrier sources is born on a plurality of IUB interface transport bearers and the number of the IUB interface transport bearers is identical with the number of the carriers in the multi-carrier, and in this case, the IUB interface framing protocol layer data stream does not need to carry the carrier identification, which processing mode is referred to as a separate IUB transport bearer mode.

In the relevant art, support capability information about each functional characteristic which is sent by the node B to the local cell of the C-RNC comprises:

An uplink multi-carrier capability, or referred to as a multi cell E-DCH capability: refers to whether the local cell supports an uplink multi-carrier (Multi Cell E-DCH), the value thereof being the support or the not support.

A shared IUB transport bearer capability, or referred to as an E-DCH UL flow multiplexing capability: refers to whether the local cell supports the shared IUB transport bearer processing mode, the value thereof being the support or the not support. When the value is the support, it represents that the local cell supports the shared IUB transport bearer processing mode; and when the value is the not support, then it represents that the local cell does not support the operation of the shared IUB transport bearer processing mode, does not support that one IUB interface framing protocol layer data stream is born by one IUB interface transport bearer, or does not support the operation that the IUB interface framing protocol layer data stream carries the carrier identification.

A separate IUB transport bearer capability: refers to whether the local cell supports the separate IUB transport bearer processing mode, the value thereof being the support or the not support.

In the relevant art, the capability support information sent by the node B to the C-RNC needs to at least carry the above three capability information, and accordingly, the C-RNC needs to all analyze the above three capability information to acquire the capability support information, which adds the processing time of the C-RNC side, thereby reducing the system performance.

CONTENTS OF THE INVENTION

The main object of the present invention is to provide a method, a system and a controlling radio network controller for determining the support capability of a local cell, so as to at least solve the above problems.

One aspect of the present invention provides a method for determining the support capability of a local cell, the method comprising the following steps: a controlling radio network controller (C-RNC) receiving from a node B capability support information about the local cell of the node B, wherein the capability support information comprises uplink multi-carrier capability support information and shared interconnection of type B (IUB) transport bearer capability support information; and the C-RNC determining by default that the local cell supports a separate IUB transport bearer, and determining an uplink multi-carrier support capability and a shared IUB transport bearer support capability of the local cell according to the capability support information.

Preferably, if the uplink multi-carrier capability support information indicates that the local cell does not support uplink multi-carrier, the C-RNC determines that the local cell supports the separate IUB transport bearer and does not support the shared IUB transport bearer.

Preferably, the capability support information consists of the uplink multi-carrier capability support information and the shared IUB transport bearer capability support information.

Preferably, the capability support information further comprises separate IUB transport bearer capability support information, and before the C-RNC determining an uplink multi-carrier support capability and a shared IUB transport bearer support capability of the local cell according to the capability support information, the method further comprises: determining whether the local cell supports the separate IUB transport bearer according to the separate IUB transport bearer capability support information, and if yes, continuing subsequent processing steps, and otherwise, the C-RNC determining that the local cell does not support the uplink multi-carrier and supports the separate IUB transport bearer.

Preferably, the capability support information of the local cell of the node B is carried by an audit response signaling.

Preferably, the capability support information of the local cell of the node B is carried by a resources state indicating signaling.

Another aspect of the present invention provides a controlling radio network controller (C-RNC), which controller comprises: a reception module, adapted to receive from a node B capability support information about a local cell of the node B, wherein the capability support information comprises uplink multi-carrier capability support information and shared interconnection of type B (IUB) transport bearer capability support information; and a first determination module, adapted to determine that the local cell supports a separate IUB transport bearer, and determine an uplink multi-carrier support capability and a shared IUB transport bearer support capability of the local cell according to the capability support information.

Preferably, if the uplink multi-carrier capability support information indicates that the local cell does not support uplink multi-carrier, the C-RNC determines that the local cell supports the separate IUB transport bearer and does not support the shared IUB transport bearer.

Preferably, the capability support information received by the reception module further comprises separate IUB transport bearer capability support information, and the C-RNC further comprises: a determination module, adapted to determine whether the local cell supports the separate IUB transport bearer according to the separate IUB transport bearer capability support information; a scheduling module, adapted to schedule the first determination module in response to a positive result from the determination module, and schedule a second determination module in response to a negative result from the determination module; and the second determination module, adapted to determine that the local cell does not the uplink multi-carrier and supports the separate IUB transport bearer.

Further another aspect of the present invention provides a system for determining the support capability of a local cell, the system comprising a node B and a C-RNC, wherein the node B is adapted to send capability support information of the local cell of the node B to the C-RNC, the capability support information comprising uplink multi-carrier capability support information and shared interconnection of type B (IUB) transport bearer capability support information; and the C-RNC is adapted to determine that the local cell supports a separate IUB transport bearer, and determine an uplink multi-carrier support capability and a shared IUB transport bearer support capability of the local cell according to the capability support information.

By virtue of the present invention, it makes the C-RNC consider by default that the local cell supports the separate IUB transport bearer and only analyzes the uplink multi-carrier capability support information and the shared IUB transport bearer capability support information, thereby solving the problem in the relevant art that the processing time of the C-RNC is relatively long, accelerating the processing the C-RNC, thus improving the system performance.

DESCRIPTION OF THE ACCOMPANYING DRAWINGS

The drawings illustrated herein provide a further understanding of the present invention and form a part of the present application. The exemplary embodiments and the description thereof are used to explain the present invention without unduly limiting the scope of the present invention. In the drawings.

PARTICULAR EMBODIMENTS

The present invention is described hereinafter in detail with reference to the accompanying drawings and in combination with the embodiments. It needs to be noted that the embodiments and the features of the embodiments in the present application can be combined with each other under the circumstances that there is no conflict.

Embodiment 1

Figure 1:
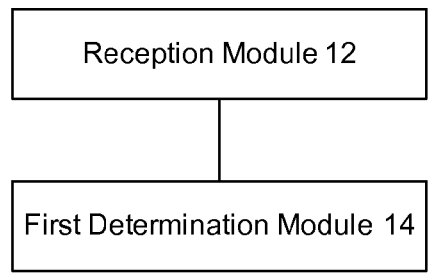
FIG. 1 is a structural block diagram of a C-RNC according to the embodiment 1 of the present invention.

The embodiment provides a C-RNC, and FIG. 1 is a structural block diagram of the C-RNC according to the embodiment 1 of the present invention, and as shown in FIG. 1, it comprises:

a reception module 12, adapted to receive from a node B capability support information about a local cell of the node B, wherein the capability support information comprises uplink multi-carrier capability support information and shared interconnection of type B (IUB) transport bearer capability support information; and, a first determination module 14 connected to the reception module 12, adapted to determine that the local cell supports a separate IUB transport bearer, and determine an uplink multi-carrier support capability and a shared IUB transport bearer support capability of the local cell according to the capability support information.

It is defaulted that the local cell supports the separate IUB transport bearer and only analyzes the uplink multi-carrier capability support information and the shared IUB transport bearer capability support information by the first determination module 14 of the C-RNC, so as to acquire the support capability of the local cell, thereby reducing the processing time of the C-RNC side and improving the system performance.

Preferably, if the uplink multi-carrier capability support information indicates that the local cell does not support the uplink multi-carrier, the first determination module 14 is adapted to determine that the local cell supports the separate IUB transport bearer and does not support the shared IUB transport bearer. Because a cell which does not support the uplink multi-carrier capability cannot support the shared IUB transport bearer, the first determination module 14 can ignore to analyze the shared IUB transport bearer capability support information and directly determine that the cell does not support the shared IUB transport bearer mode under the circumstance of determining that the local cell does not support the uplink multi-carrier, which saves the time spent for analyzing the shared IUB transport bearer capability support information by the first determination module 14, thus further reducing the processing time of the C-RNC.

Figure 2:
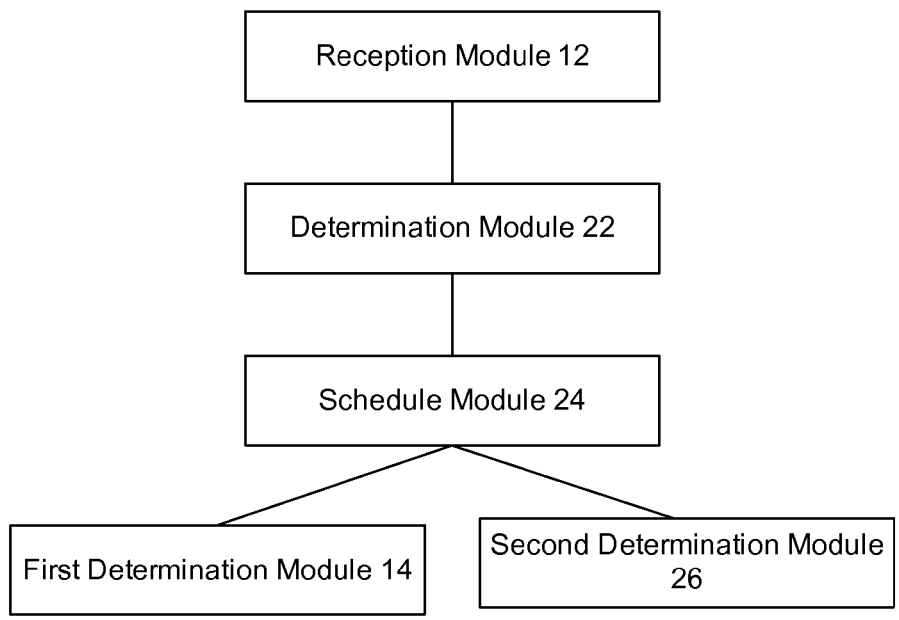
FIG. 2 is a detail structural block diagram of a C-RNC according to the embodiment 1 of the present invention.

Preferably, the capability support information received by the reception module 12 further comprises separate IUB transport bearer capability support information, and as shown in FIG. 2, the C-RNC further comprises: a determination module 22, adapted to determine whether the local cell supports the separate IUB transport bearer according to the separate IUB transport bearer capability support information; a scheduling module 24 connected to the determination module 22, adapted to schedule the first determination module 14 if the determination result of the determination module 22 is yes, and schedule a second determination module 26 if the determination result of the determination module 22 is no; and the second determination module 26 connected to the scheduling module 24, adapted to determine that the local cell does not the uplink multi-carrier and supports the separate IUB transport bearer.

From the perspective of the C-RNC, supporting the separate IUB transport bearer processing mode can be served as a capability which has been had and certainly needs to be supported by the single-carrier technology phase, and a traditional single-carrier local cell can be served as supporting the separate IUB transport bearer processing mode, and therefore, whether it is a local cell supporting the uplink multi-carrier or supporting the uplink single-carrier, it both can provide the support for the separated IUB transport bearer, and therefore, if the separate IUB transport bearer support capability information indicates that the local cell does not support the separate IUB transport bearer, then it indicates that the errors exist in the capability support information, which may be caused due to the misconfiguration of the node B or the errors in the transport process. The C-RNC can consider that the local cell does not the uplink multi-carrier and only serve it as the traditional single-carrier cell to process, and even if the local cell can support the uplink multi-carrier, and it can also provide the compatibility for the single-carrier, which processing mode is relatively safe and the stability thereof is relatively high.

Figure 3:
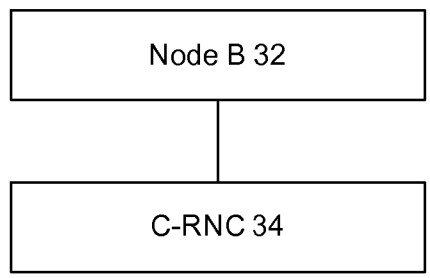
FIG. 3 is a structural block diagram of a system for determining the support capability of a local cell according to the embodiment 1 of the present invention.

The embodiment further provides a system for determining the support capability of a local cell, and FIG. 3 is a structural block diagram of a system for determining the support capability of a local cell according to the embodiment 1 of the present invention, and as shown in FIG. 3, it comprises a node B 32 and a C-RNC 34, in which the node B 32 is adapted to send to the C-RNC 34 capability support information about the local cell of the node B 32, wherein the capability support information comprises uplink multi-carrier capability support information and shared interconnection of type B (IUB) transport bearer capability support information; and the C-RNC 34 is adapted to determine that the local cell supports a separate IUB transport bearer, and determine an uplink multi-carrier support capability and a shared IUB transport bearer support capability of the local cell according to the capability support information. By way of the system, the processing time of the C-RNC side can be reduced, thus improving the system performance.

Embodiment 2

Figure 4:
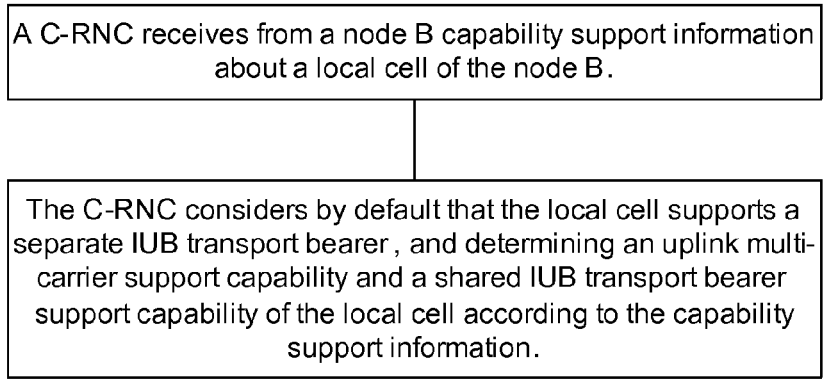
FIG. 4 is a flow chart of a method for determining the support capability of a local cell according to the embodiment 2 of the present invention.

The embodiment further provides a method for determining the support capability of a local cell, and FIG. 4 is a flow chart of a method for determining the support capability of a local cell according to the embodiment 2 of the present invention, and as shown in FIG. 4, the method comprises the following steps:

step S402, a C-RNC receives from a node B capability support information about a local cell of the node B, wherein the capability support information comprises uplink multi-carrier capability support information and shared interconnection of type B (IUB) transport bearer capability support information; and, step S404, the C-RNC considers by default that the local cell supports a separate IUB transport bearer, and determining an uplink multi-carrier support capability and a shared IUB transport bearer support capability of the local cell according to the capability support information.

For a traditional single-carrier local cell, which means in the single carrier HSUPA technology, one IUB interface framing protocol layer data stream is born by one IUB interface transport bearer, wherein the IUB interface framing protocol layer data stream does not need to carry a carrier identification. Therefore, the traditional single-carrier local cell can be served as supporting the separate IUB transport bearer processing mode. From the perspective of the C-RNC, a local cell supporting the uplink multi-carrier (Multi Cell E-DCH) can also be served as a traditional single-carrier local cell to be carried out the resource utilization and use, i.e. it can achieve the backward compatibility for the traditional single-carrier local cell, which can be served as supporting the separate IUB transport bearer processing mode, and based on the above considerations, the C-RNC in the method considers by default that the local cell supports the separate IUB transport bearer, on one hand which can only analyze the uplink multi-carrier capability support information and the shared IUB transport bearer capability support information, so as to acquire the support capability of the local cell, thereby reducing the processing time of the C-RNC side and improving the system performance; on the other hand, which enables the local cell which does not support the uplink multi-carrier to be added into the macro diversity by serving as a cell supporting the separate IUB transport bearer, thereby improving the macro diversity gain of the soft handoff and improving the system performance.

It needs to be noted that under the circumstance of similar to the relevant art, i.e. the circumstance that the capability support information further comprises the separate IUB transport bearer capability, although the capability support information received by the C-RNC side is not reduced, the embodiment saves the time of analyzing the separate IUB transport bearer capability by making the C-RNC consider by default that the local cell supports the separate IUB transport bearer, and therefore, the effect of reducing the processing time of the C-RNC side can also be achieved.

Preferably, if the uplink multi-carrier capability support information indicates that the local cell does not support the uplink multi-carrier, the C-RNC determines that the local cell supports the separate IUB transport bearer and does not support the shared IUB transport bearer. Because a cell which does not support the uplink multi-carrier capability does not support the shared IUB transport bearer, in order to further reduce the processing time of the C-RNC side, analyzing the shared IUB transport bearer capability support information can be ignored, and it can be directly determined that the cell does not support the shared IUB transport bearer mode under the circumstance of determining that the local cell does not support the uplink multi-carrier.

Preferably, the capability support information only consists of the uplink multi-carrier capability support information and the shared interconnection of type B (IUB) transport bearer capability support information. Considering that the C-RNC in the method only needs to analyze the uplink multi-carrier capability support information and the shared IUB transport bearer capability support information, in the node B side, it can also be informed with the uplink multi-carrier capability support information and the shard IUB transport bearer capability support information, thereby reducing the consumption of the system bandwidth. In addition, the separate IUB transport bearer capability information is removed from the support capability of the each functional characteristic of the local cell, which can avoid the understanding ambiguity caused by the configuration errors.

Preferably, the capability support information further comprises separate IUB transport bearer capability support information, and before the determining, by the C-RNC, an uplink multi-carrier support capability and a shared IUB transport bearer support capability of the local cell according to the capability support information, the method further comprises: determining whether the local cell supports the separate IUB transport bearer according to the separate IUB transport bearer, if yes, continuing the subsequent processing, and otherwise, determining, by the C-RNC, that the local cell does not support the uplink multi-carrier and supports the separate IUB transport bearer.

Different from the role played by the separate IUB transport bearer capability support information contained in the capability support information in the relevant art, in the method, the separate IUB transport bearer capability support information can play the role of detecting the errors, as the above, from the perspective of the C-RNC, supporting the separate IUB transport bearer processing mode can be served as a capability which has been had and certainly needs to be supported by the single-carrier technology phase, and a traditional single-carrier local cell can be served as supporting the separate IUB transport bearer processing mode, and therefore, whether it is a local cell supporting the uplink multi-carrier or supporting the uplink single-carrier, it both can provide the support for the separated IUB transport bearer, and therefore, if the separate IUB transport bearer support capability information indicates that the local cell does not support the separate IUB transport bearer, then it indicates that the errors exist in the capability support information, which may be caused due to the misconfiguration of the node B or the errors in the transport process. As an optional mode of processing the errors, as the above, the C-RNC can consider that the local cell does not the uplink multi-carrier and only serve it as the traditional single-carrier cell to process, and even if the local cell can support the uplink multi-carrier, and it can also provide the compatibility for the single-carrier, which processing mode is relatively safe and the stability thereof is relatively high.

Preferably, the capability support information about the local cell of the node B is carried by an audit response signaling or by a resources state indicating signaling, but it is not limited to this, and it can also be carried by adopting the other existing signaling or by adopting the newly added signaling.

Embodiment 3

Figure 5:
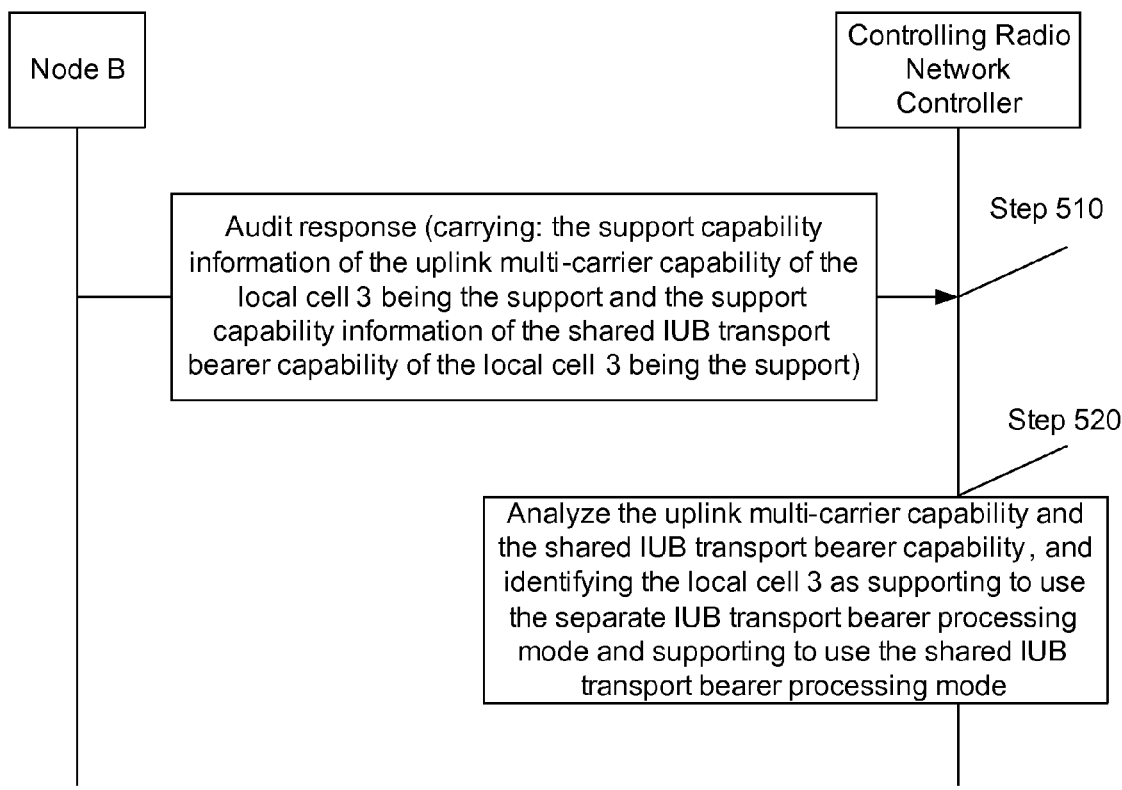
FIG. 5 is a schematic diagram of processing steps according to the embodiment 3 of the present invention.

Setting a scenario: the identification of a local cell of a node B is 3. The support capability information of the uplink multi-carrier capability (Multi Cell E-DCH Capability) of the local cell 3 is the support. The support capability information of the shared IUB transport bearer capability (E-DCH UL Flow Multiplexing Capability) of the local cell 3 is the support. As shown in FIG. 5, the method for determining the support capacity of the local cell comprises the following steps:

Step 510: a controlling radio network controller has received an audit response signaling sent by the node B, the support capability information of the uplink multi-carrier capability (Multi Cell E-DCH Capability) which is the support and the support capability information of the shared IUB transport bearer capability (E-DCH UL Flow Multiplexing Capability) which is the support of the local cell 3 is carried in the audit response signaling.

Step 520: the controlling radio network controller analyzes the support capability information of the uplink multi-carrier capability (Multi Cell E-DCH Capability) as the support and the support capability information of the shared IUB transport bearer capability (E-DCH UL Flow Multiplexing Capability) as the support, and then the controlling radio network controller identifies the local cell 3 as supporting to use the separate IUB transport bearer processing mode and supporting to use the shared IUB transport bearer (E-DCH UL Flow Multiplexing) processing mode.

Embodiment 4

Figure 6:
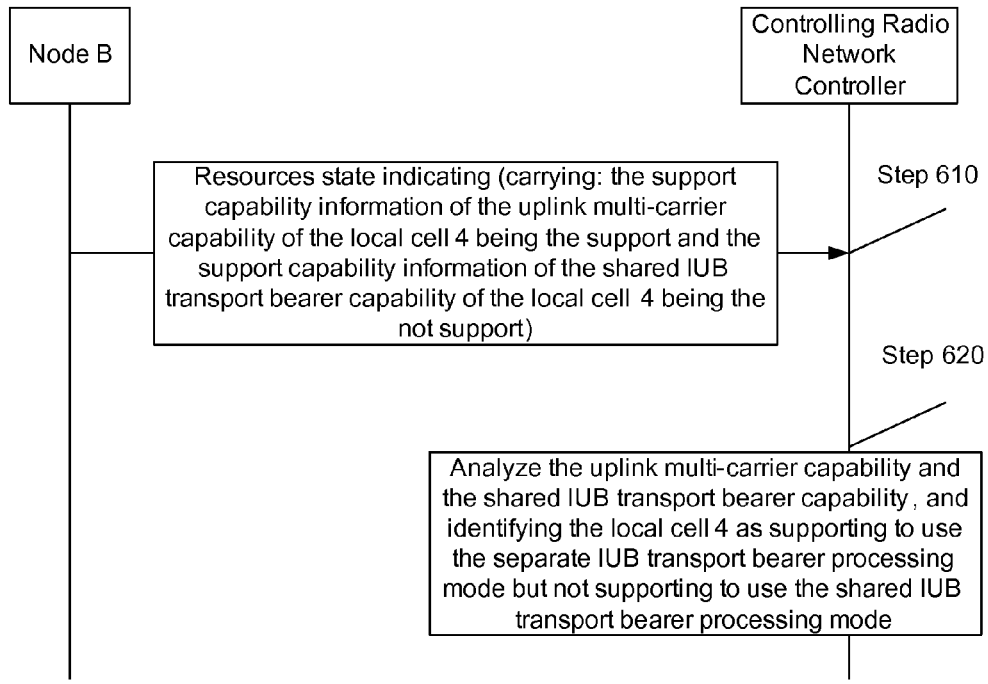
FIG. 6 is a schematic diagram of processing steps according to the embodiment 4 of the present invention.

Setting a scenario: the identification of a local cell of a node B is 4. The support capability information of the uplink multi-carrier capability (Multi Cell E-DCH Capability) of the local cell 4 is the support. The support capability information of the shared IUB transport bearer capability (E-DCH UL Flow Multiplexing Capability) of the local cell 4 is the not support. As shown in FIG. 6, the method for determining the support capacity of the local cell comprises the following steps:

Step 610: a controlling radio network controller has received a resources state indicating signaling sent by the node B, the support capability information of the uplink multi-carrier capability (Multi Cell E-DCH Capability) which is the support and the support capability information of the shared IUB transport bearer capability (E-DCH UL Flow Multiplexing Capability) which is the not support of the local cell 4 is carried in the resources state indicating signaling.

Step 620: the controlling radio network controller analyzes the support capability information of the uplink multi-carrier capability (Multi Cell E-DCH Capability) as the support but the support capability information of the shared IUB transport bearer capability (E-DCH UL Flow Multiplexing Capability) as the not support, and then the controlling radio network controller identifies the local cell 4 as supporting to use the separate IUB transport bearer processing mode but not supporting to use the shared IUB transport bearer (E-DCH UL Flow Multiplexing) processing mode.

Embodiment 5

Figure 7:
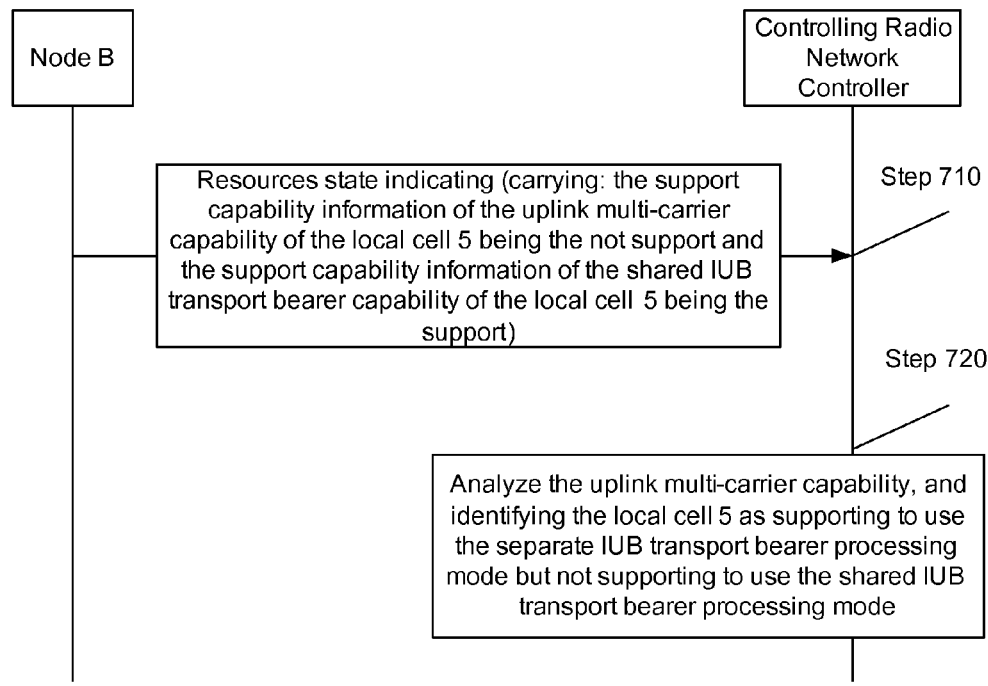
FIG. 7 is a schematic diagram of processing steps according to the embodiment 5 of the present invention.

Setting a scenario: the identification of a local cell of a node B is 5. The support capability information of the uplink multi-carrier capability (Multi Cell E-DCH Capability) of the local cell 5 is the not support. The support capability information of the shared IUB transport bearer capability (E-DCH UL Flow Multiplexing Capability) of the local cell 5 is the support, and as shown in FIG. 7, the method for determining the support capability of the local cell comprises the following steps:

Step 710: a controlling radio network controller has received a resources state indicating signaling sent by the node B, the support capability information of the uplink multi-carrier capability (Multi Cell E-DCH Capability) which is the not support and the support capability information of the shared IUB transport bearer capability (E-DCH UL Flow Multiplexing Capability) which is the support of the local cell 5 is carried in the resources state indicating signaling.

Step 720: the controlling radio network controller analyzes the support capability information of the uplink multi-carrier capability (Multi Cell E-DCH Capability) as the not support, and no matter what the support capability information of the shared IUB transport bearer capability (E-DCH UL Flow Multiplexing Capability) is, and then the controlling radio network controller identifies the local cell 5 as supporting to use the separate IUB transport bearer processing mode but not supporting to use the shared IUB transport bearer (E-DCH UL Flow Multiplexing) processing mode.

In summary, in the solution provided by the embodiments of the present invention, from the perspective of the controlling radio network controller, supporting the separate IUB transport bearer processing mode can be served as a capability which has been had and certainly needs to be supported by the single-carrier technology phase, and the shared IUB transport bearer processing mode can be served as a more advanced capability which can be selected and is introduced in the multi-carrier technology phase. In this way, the controlling radio network controller can carry out the soft handoff to add a new local cell without any obstacle. For the macro diversity in which there is a traditional single-carrier cell, the controlling radio network controller can control to use the separate IUB transport bearer processing mode. For the macro diversity in which all are the local cell supporting the uplink multi-carrier capability and all are the local cell supporting the shared IUB transport bearer processing mode, the controlling radio network controller can determine to control to use the separate IUB transport bearer processing mode or control to use the shared IUB transport bearer processing mode according to a certain algorithm. The solution accelerates the processing of the C-RNC, thereby improving the system performance, in addition, improving the macro diversity gain of the soft handoff and improving the system performance.

Obviously, those skilled in the art shall understand that the above modules and steps of the present invention can be realized by using general purpose calculating device, which can be integrated in one calculating device or distributed on a network which consists of a plurality of calculating devices, alternatively, they can be realized by using the executable program code of the calculating device, consequently, they can be stored in the storing device and executed by the calculating device, and in some cases the shown or described steps can be executed by orders which are different from herein, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for determining the support capacity of a local cell, comprising the following steps of:
    a controlling radio network controller (C-RNC) receiving from a node B capability support information about the local cell of the node B, wherein the capability support information comprises uplink multi-carrier capability support information and shared interconnection of type B (IUB) transport bearer capability support information; and,
    the C-RNC determining by default that the local cell supports a separate IUB transport bearer, and determining an uplink multi-carrier support capability and a shared IUB transport bearer support capability of the local cell according to the capability support information,
    wherein the capability support information further comprises separate IUB transport bearer capability support information, and before the C-RNC determining an uplink multi-carrier support capability and a shared IUB transport bearer support capability of the local cell according to the capability support information, the method further comprising:
        determining whether the local cell supports the separate IUB transport bearer according to the separate IUB transport bearer capability support information, and if yes, continuing subsequent processing steps, and otherwise, the C-RNC determining that the local cell does not support the uplink multi-carrier and supports the separate IUB transport bearer.

2. The method according to claim 1, wherein, if the uplink multi-carrier capability support information indicates that the local cell does not support uplink multi-carrier, the C-RNC determines that the local cell supports the separate IUB transport bearer and does not support the shared IUB transport bearer.

3. The method according to claim 1, wherein the capability support information comprises the uplink multi-carrier capability support information and the shared IUB transport bearer capability support information only.

4. The method according to claim 1, wherein the capability support information of the local cell of the node B is carried by an audit response signaling.

5. The method according to claim 1, wherein the capability support information of the local cell of the node B is carried by a resources state indicating signaling.

6. A controlling radio network controller (C-RNC), comprising:
    a reception module, adapted to receive from a node B capability support information about a local cell of the node B, wherein the capability support information comprises uplink multi-carrier capability support information and shared interconnection of type B (IUB) transport bearer capability support information; and,
    a first determination module, adapted to determine that the local cell supports a separate IUB transport bearer, and determine an uplink multi-carrier support capability and a shared IUB transport bearer support capability of the local cell according to the capability support information,
    wherein the capability support information received by the reception module further comprises separate IUB transport bearer capability support information, and the C-RNC further comprising:

a determination module, adapted to determine whether the local cell supports the separate IUB transport bearer according to the separate IUB transport bearer capability support information;

a scheduling module, adapted to schedule the first determination module in response to a positive result from the determination module, and schedule a second determination module in response to a negative result from the determination module; and the second determination module, adapted to determine that the local cell does not the uplink multi-carrier and supports the separate IUB transport bearer.

7. The C-RNC according to claim 6, wherein, if the uplink multi-carrier capability support information indicates that the local cell does not support uplink multi-carrier, the C-RNC determines that the local cell supports the separate IUB transport bearer and does not support the shared IUB transport bearer.

8. A system for determining the support capacity of a local cell, the system comprising a node B and a C-RNC, wherein the node B is adapted to send capability support information of the local cell of the node B to the C-RNC, the capability support information comprising uplink multi-carrier capability support information and shared interconnection of type B (IUB) transport bearer capability support information; and the C-RNC is adapted to determine that the local cell supports a separate IUB transport bearer, and determine an uplink multi-carrier support capability and a shared IUB transport bearer support capability of the local cell according to the capability support information, wherein the capability support information further comprises separate IUB transport bearer capability support information, and before the C-RNC determining an uplink multi-carrier support capability and a shared IUB transport bearer support capability of the local cell according to the capability support information, and the C-RNC determining whether the local cell supports the separate IUB transport bearer according to the separate IUB transport bearer capability support information, and if yes, continuing subsequent processing steps, and otherwise, the C-RNC determining that the local cell does not support the uplink multi-carrier and supports the separate IUB transport bearer.

\* \* \* \* \*